Aug. 19, 1941.   C. O. GOSERUD   2,252,888
LAWN EDGER
Filed Aug. 28, 1939
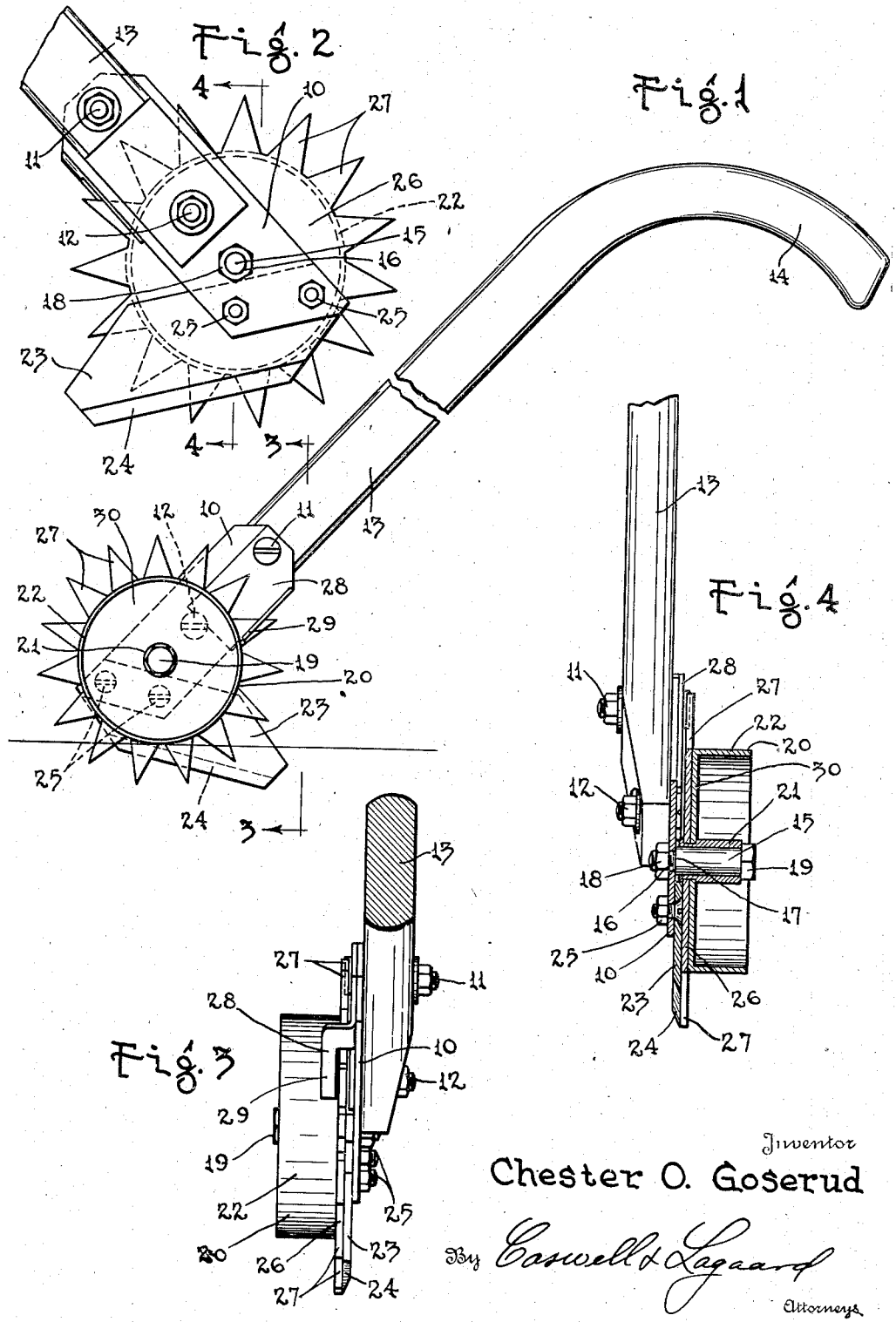
Inventor
Chester O. Goserud
By Caswell & Lagaard
Attorneys Patented Aug. 19, 1941

2,252,888

UNITED STATES PATENT OFFICE 2,252,888

LAWN EDGER

Chester O. Goserud, St. Paul, Minn.

Application August 28, 1939, Serial No. 292,223

3 Claims. (Cl. 30—292)

My invention relates to lawn edgers and has for an object to provide a lawn edger by means of which the vegetation growing at the edge of a sidewalk may be easily and effectively trimmed.

Another object of the invention resides in providing a lawn edger in which the vegetation is cut at the edge of the walk without the removal of any of the sod or turf.

An object of the invention resides in providing a lawn edger which is positive in action and requires a minimum amount of effort.

A still further object of the invention resides in providing a lawn edger in which the vegetation to be cut is held in position during the cutting operation.

An object of the invention resides in providing a frame having a supporting wheel journalled relative thereto adapted to travel along the edge of the walk, and a handle for advancing the edger along the walk and in further providing a fixed cutting blade and adapted to follow along the edge of the walk to cut the vegetation.

A feature of the invention resides in providing a movable member movable relative to the blade and adapted to engage the vegetation cut to hold the same in position during operation of the blade.

A feature of the invention resides in utilizing a toothed disc for the purpose of holding the vegetation in position.

A still further object of the invention resides in coaxially mounting said disc and supporting wheel.

Another object of the invention resides in causing the disc and supporting wheel to travel in unison.

Other objects of the invention reside in the novel combination and arrangement of parts and in the details of construction hereinafter illustrated and/or described.

In the drawing:

Fig. 1 is an elevational view of a lawn edger illustrating an embodiment of my invention.

Fig. 2 is an elevational view of a portion of the lawn edger shown in Fig. 1 and viewed from the opposite side, said view being drawn to a larger scale.

Fig. 3 is an elevational sectional view taken on line 3—3 of Fig. 1.

Fig. 4 is an elevational sectional view taken on line 4—4 of Fig. 2.

In the use of lawn edgers in which a portion of the turf or sod is removed and where a knife is forced through the same, considerable effort is required in manipulating the edger. The present invention overcomes this difficulty by providing a construction in which merely the vegetation overhanging the walk is cut so that a minimum amount of effort is required in operating the device.

My invention comprises a frame 10 which is constructed from a plate of metal and which is elongated in form. This frame has attached to the uppermost portion thereof by means of two bolts 11 and 12 a handle 13. Handle 13 extends upwardly and rearwardly and is formed at its upper end with a hand grip 14. This handle serves to advance the edger along the walk as will be hereinafter more fully described.

Attached to the frame 10, intermediate the ends thereof, is a stud 15. This stud is formed with a reduced threaded portion 16 which passes through the frame 10, and which provides a shoulder 17 at its juncture with said stud engaging one surface of the frame 10. A nut 18 screwed upon the threaded portion 16 engages the other surface of frame 10 and holds the stud 15 rigidly attached to the frame. The stud 15 is constructed with a head 19 at its outer end. Rotatably mounted on the stud 15 is a hub 21 which has attached to it the flange 20 of a wheel 22. This wheel serves as a supporting wheel and has a tread 30 which is adapted to travel along the surface of the walk where the lawn is to be trimmed and holds the operating parts of the lawn edger at the proper elevation.

Attached to the lowermost portion of the frame 10, by means of bolts 25, is a cutting blade 23. This cutting blade is constructed with a cutting edge 24 which is inclined relative to the surface of the ground and which is disposed outwardly of the periphery of the tread 30 of wheel 22. When the handle 13 is held, as shown in Fig. 1, the blade 23 projects downwardly below the surface of the lawn in inclined relation where the same may cut the vegetation as the edger is advanced along the walk.

Operating in conjunction with the blade 23 I provide a disc 26 which is provided with pointed teeth 27 at its periphery. The disc is mounted on the hub 21 adjacent the flange 20 of the wheel 22 and both said wheel and disc travel in unison. The teeth 27 project outwardly beyond the cutting edge 24 of the blade 23. The diameter of the wheel 22 is approximately equal to the root diameter of the disc 26 so that the teeth 27 project outwardly beyond the said wheel.

Operating in conjunction with the disc 26 is a stripper 28, best shown in Fig. 3. This stripper has a finger 29 which overlies the disc 26 upon the surface thereof adjacent the supporting wheel 22. The finger 29 serves to disengage from the disc any of the vegetation cut by the blade 23 that may adhere thereto. The stripper 28 is attached to the frame 10 by means of the bolts 11 and 12 as shown in Fig. 1.

The operation of the invention is as follows: The device is grasped by the handle 13 and hand grip 14 and the blade 23 together with the lowermost teeth 27 of the disc 26, are forced into the turf with the inner face of said disc against the edge of the walk and with the wheel 22 overhanging the upper surface of said walk. Holding the hand grip 13 slightly below waist level and pushing forwardly thereon, the operator advances the device. Thereupon, the disc 26 is caused to rotate, the teeth 27 at the bottom of the disc penetrating and biting into turf to effect such rotation. The number of teeth 27 is relatively great and a plurality of the lowermost of said teeth simultaneously penetrate the turf. These teeth 27 being V-shaped and the notches therebetween being similarly shaped, the several teeth penerating the turf at the same time cause the segregation, gathering and holding of a number of successive tufts of grass in said notches. Since the cutting edge 24 of the blade 23 is inclined rearwardly and downwardly across the several notches in which the tufts of grass are simultaneously gathered and held, said cutting edge, at different portions thereof, concurrently cuts the several tufts of grass, initiating the cut of the foremost tuft and simultaneously completing the severance of the rearmost tuft. Under normal operating conditions, the toothed disc 26 penetrates the turf approximately to the root diameter thereof, any further penetration of the turf by said disc being precluded by engagement of the wheel 22 with a walk or other boundary object along which the edging of the turf is being performed, or by the engagement of said wheel 22 with the turf itself, as at the edge of a cultivated area along which the edging is being effected.

The advantages of my invention are manifest. The device is extremely simple in construction and can be manufactured at a nominal expense. The toothed disc does not necessarily have to engage the cutting blade and the same hence does not have to be sharpened. For this reason the blade alone can be sharpened and the edger thus kept in operating condition in an easy and simple manner. There are no complicated operating parts to get out of order and the device will operate indefinitely without trouble. It is light in weight and easily carried about. It cuts cleanly and operates with minimum effort by reason of the gathering of the grass into tufts and the holding of a number of such tufts simultaneously in relation to different portions of the cutting edge of the blade, whereby the blade acts to cut said held tufts concurrently, initiating its cutting action with the foremost tuft and, at the same time, completing the severance of the rearmost tuft.

I claim:

1. In a device for edging a lawn along a walk, a disc adapted to be rolled edgewise over the turf of the lawn with its inner face adjacent said walk, a handle for manipulating the device, a plate-like frame member secured to said handle and having a stud attached thereto, said disc being revolubly mounted on said stud and having V-shaped teeth about the perimeter thereof with similarly shaped notches between said teeth, the lowermost teeth of the disc being adapted to penetrate the turf and segregate, gather and hold a number of successive tufts of grass in the V-shaped notches therebetween, a blade secured to said frame member in flatwise disposition between the same and said disc, said blade having a cutting edge inclined rearwardly and downwardly across the several V-shaped notches between said lowermost teeth, said cutting edge being adapted at its different portions across said notches concurrently to cut the several held tufts of grass, initiating the cut of the foremost tuft and completing the severance of the rearmost tuft simultaneously, and an annular member concentric with and extending inwardly from said inner face of said disc, said annular member being engageable with the upper surface of the walk to limit the penetration into the turf of said disc and blade.

2. In a lawn edging device, a disc adapted to be rolled edgewise along the turf and having V-shaped teeth about the perimeter thereof with similarly shaped notches between said teeth, the lowermost teeth of said disc being adapted to penetrate the turf and segregate, gather and hold a number of successive tufts of grass in the V-shaped notches therebetween, a handle member, said disc being revolubly connected thereto, a blade fixedly connected to said handle member, said blade having a cutting edge disposed in a plane adjacent to the plane of said disc and inclined rearwardly and downwardly from a point near the root diameter of said toothed disc to a point beyond the outside diameter of said disc across the several V-shaped notches between said lowermost teeth, said cutting edge being adapted at its different portions across said notches concurrently to cut the several held tufts of grass, initiating the cut of the foremost tuft and completing the severance of the rearmost tuft simultaneously.

3. In a device of the class described, a disc adapted to be rolled edgewise along the turf and having teeth about its perimeter, a plurality of the lowermost teeth being adapted to penetrate the turf and segregate and hold a number of successive tufts of grass in the spaces therebetween, a handle member, said disc being revolubly connected thereto, a blade fixedly connected to said handle member, said blade having a cutting edge disposed in a plane adjacent to the plane of said disc and inclined rearwardly and downwardly across the several spaces between said lowermost teeth, said cutting edge being adapted at its different portions across said spaces concurrently to cut the several tufts of grass, initiating the cut of the foremost tuft and completing the severance of the rearmost tuft simultaneously.

CHESTER O. GOSERUD.